United States Patent [19]

McDaniel et al.

[11] Patent Number: 4,764,679

[45] Date of Patent: Aug. 16, 1988

[54] KINESTATIC CHARGE DETECTOR

[75] Inventors: David L. McDaniel, Dousman; Paul R. Granfors, Milwaukee; David M. Hoffman, New Berlin, all of Wis.

[73] Assignee: General Electric Company, Milwaukee, Wis.

[21] Appl. No.: 895,725

[22] Filed: Aug. 12, 1986

[51] Int. Cl.[4] .......................... G01T 1/185; H01J 47/00

[52] U.S. Cl. .................................. 250/374; 250/385.1; 378/19

[58] Field of Search .................... 250/374, 385 R, 386; 378/19; 313/313, 326

[56] References Cited

U.S. PATENT DOCUMENTS

| | | | |
|---|---|---|---|
| 4,190,771 | 2/1980 | Kamei et al. | 250/385 |
| 4,376,893 | 3/1983 | Whetten | 250/374 |
| 4,686,369 | 8/1987 | McDaniel et al. | 250/385 |

FOREIGN PATENT DOCUMENTS

| | | | |
|---|---|---|---|
| 0186348 | 7/1986 | European Pat. Off. | 313/326 |

OTHER PUBLICATIONS

Frank A. DiBianca and Marion D. Barker, "Kinestatic Charge Detection", *Med. Phys.*, vol. 12, No. 3 (May/-Jun. 1985) pp. 339-343.

*Primary Examiner*—Janice A. Howell

*Assistant Examiner*—Constantine Hannaher

*Attorney, Agent, or Firm*—James H. Beusse; Douglas E. Stoner

[57] ABSTRACT

Quantum detection efficiency and spatial resolution in a kinestatic charge detector are improved by utilization of an x-ray transmissive device positioned within a collection volume of a kinestatic charge detector x-ray detection chamber for displacing the charge carrier generating medium within predetermined areas of the chamber. Within the chamber, quantum detection efficiency and spatial resolution are affected by distortion in electric field lines existing between a high voltage anode and a relatively low voltage collector electrode. The distorted field lines cause charge carriers generated in the medium by impinging radiation to impact on either the walls of the chamber or to follow non-linear paths between the point of creation and the collection electrode. By displacing the medium in the chamber in areas having the greatest electric field distortion, the quantum detection efficiency and spatial resolution are improved. In one embodiment an x-ray transmissive device is placed in the chamber adjacent an x-ray emitting window and has a portion extending partially into the space between the anode and collector electrode. In another embodiment, an additional device is positioned in the chamber adjacent a rear wall thereof for displacing the medium in the rear portion of the chamber.

19 Claims, 3 Drawing Sheets

KINESTATIC CHARGE DETECTOR

This invention relates to ionization chamber x-ray detectors and, more specifically, to a method and apparatus for improved detection efficiency and spatial resolution in a kinestatic charge detector system.

BACKGROUND OF THE INVENTION

The kinestatic charge detector (KCD) is an x-ray radiation detection apparatus which offers significant advantages over more conventional radiography apparatus. In a KCD system, there is provided an x-ray detection volume and a signal collection volume formed in a closed chamber. In the detection volume, there is generally disposed some type of medium which will interact with x-ray radiation to produce secondary energy. The medium is generally enclosed within a defined space and the collection volume is preferably a multi-element detector of secondary energy located at one boundary of the detection volume. An applied electric field across the detection volume imparts a constant drift velocity to secondary energy particles or charges driving the charges of one sign towards the signal collection volume. Charges of the other sign will drift in a direction away from the collection volume and will not contribute to any output signal.

In the operation of the system, an x-ray beam scans a patient and the x-ray radiation passing through the patient is directed into the detection volume. The KCD is oriented such that the one-dimensional array of collector electrodes spans the fan beam which is transverse to the direction of scan, and the width of the x-ray beam in the scan direction is matched to the height of the detection volume. The x-ray radiation collides with particles in the medium of the detection volume creating a secondary energy. The electric field across the detection volume is produced between a first electrode at one side of the detection volume and the plane of the collection volume (collection electrodes) and the direction of the field is substantially perpendicular to the path of the radiation admitted into the detection volume. The electric field causes charge carriers (secondary energy) between the first electrode and the collection electrode to drift toward the collection electrode at a substantially constant drift velocity. The chamber itself, including the detection and collection volumes, is mechanically coupled to an apparatus which moves the chamber in a direction opposite to the direction of drift of the charges at a constant velocity of a magnitude substantially equal to the magnitude of the drift velocity of the charges. The currents flowing in the plural collection electrodes resulting from charges produced on the collection electrodes by the charge carriers are sensed. The spatial distribution in two dimensions of the radiation admitted into the chamber is determined in response to the amplitude with respect to time of the second current flowing in the respective plural collection electrodes. The spatial distribution of radiation in the transverse direction is determined by the spacing of the collection electrodes. Thus, in a KCD system, two-dimensional information can be obtained using a one-dimensional array of collector electrodes.

Since the motion of the chamber is in a direction opposite to the drift of the charge carriers created in the medium in the detection volume, the x-ray radiation passing through each small area of the patient in the x-ray beam is integrated over the time that it takes for the charge carriers in the detection volume to drift through the space of the volume. This integration, which is required in order to obtain adequate signal levels, was achieved in prior art fan-beam systems using two-dimensional arrays of collector electrodes comprised, by way of example, of 80 to 100 elements in the scan direction and 2000 elements in the transverse direction. The KCD system provides the same information using a one-dimensional detector array and thus avoids the cost and complexity of large two-dimensional detector arrays as in the prior art.

Within the detection volume, a grid separates the space between the first electrode and the collector electrode into a drift region and a collection region. The grid shields the collector electrodes from any induced current caused by the charges in the drift region so that only ions in the collection region are detected by the collection electrodes. The spacing between the grid and collection electrodes is one factor affecting the resolution of the system. The data obtained at the collection electrodes is digitally processed to generate an image. In that sense, KCD is a form of digital radiography.

In the operation of the kinestatic charge detector, the drift velocity of the charge carriers or charge clouds within the chamber of the detector must be known so that the detector can be moved at a velocity equal in magnitude to the drift velocity of the charge carriers. The drift velocity is constant only to the extent that the electric field existing between the two spaced electrodes within the detector is uniform, constant and parallel to the desired direction of drift of the charges. Any distortion in the electric field between the electrodes will cause blurring due to variations in the drift velocity and variations in the path length along the electric field lines of force between the electrodes.

One region within the detector in which the electric field may be distorted is in the space in proximity to a front window of the detector at which the x-ray radiation enters. Another region of concern is the rear wall of the detector. In general, the electric field deep within the detection volume is uniform and normal to the collection electrode. However, near the front window the electric field lines of force are bent toward the window. Distortion of the electric field in the area of the radiation admission window reduces the quantum detection efficiency (QDE) of the detector by creating a "dead space" near the front window. Because the field lines of force in the dead space end on the vessel walls or front window rather than the collection electrode, charges formed in the dead space strike the window and do not contribute to the signal output of the collection electrode. In addition, the lines of force which end on the collection electrode in the area of the window are curved rather than straight and cause charge carriers following them to travel over a longer path and with a lower average speed than they would if the lines of force were straight. Image blurring will result because such charge carriers take a longer time to traverse the detection volume and therefore are not stationary in space as the detector is translated at constant velocity.

One proposed solution to reduction of the "dead space" at the front or window of the detector is to dispose an insulative material on the surface of the window and to mount evenly spaced conductive strips oriented in a direction perpendicular to the collection electrodes and perpendicular to the direction of the incident x-ray beam. The conductive strips are connected to an electrical source so that potentials on these strips can be adjusted to create a field which compensates for the electric field distortions normally present near the window of the detector. Alternatively, a highly resistive material may be substituted for the conducting strips. The potential across the resistive material is maintained such that an electric field is created that compensates for the distortions present in the "dead space". Such arrangements, however, cannot totally compensate for field distortions and are progressively more difficult to implement as the allowed amount of distortion is reduced.

OBJECTS OF THE INVENTION

It is an object of the present invention to provide a method and apparatus for improving the quantum detection efficiency of a kinestatic charge detector.

A further object of the present invention is to provide a method and apparatus for improving quantum detection efficiency while improving the spatial resolution of a kinestatic charge detector.

A still further object of the present invention is to provide a method and apparatus for improving quantum detection efficiency and improving spatial resolution without external electrical modification of the electric field in a kinestatic charge detector.

SUMMARY OF THE INVENTION

The present invention discloses a method and apparatus for improving the quantum detection efficiency and the spatial resolution of a kinestatic charge detector. The method and apparatus of the present invention may be applied to both the region adjacent the x-ray radiation admissive window of the kinestatic charge detector and to the region near the rear wall of the detector. In general, the present invention involves an exclusion of charge carriers from being created or drifting in regions where the electric field is not uniform, homogeneous and parallel to a desired drift direction for the charge carriers. In an illustrative embodiment, the invention comprises filling the space between the window and the electrodes and the space between the electrodes where the field is non-uniform with an insulating material which has a low x-ray attenuation. The material displaces the gas detecting medium and prevents charge formation in the "dead space" area. In an exemplary embodiment, an x-ray transmissive material such as LEXAN polycarbonate is formed to have a shape which will allow the material to be attached to one of the electrodes so that it can be positioned to fill the space between the window and the electrodes and also a portion of the space between the electrodes over which the field is non-uniform. Preferably, the filler material is rigid and can be attached to the high voltage electrode which is generally thick and rigid so that precise alignment of the spacer is easy to achieve. By displacing the medium in the area of the window and over a portion of that space between the electrodes in which the field is non-uniform, charge carriers are not created in that space and therefore do not affect the overall image created from collection of the charge carriers in the detector. Furthermore, the quantum detection efficiency is increased since some of the radiation particles which previously interacted with molecules in the medium to create charge carriers in the dead space now interact with molecules in the medium to create charge carriers which can be detected by the collection electrodes. In this manner, the quantum detection efficiency of the KCD is improved.

DESCRIPTION OF THE DRAWINGS

For a better understanding of the present invention, reference may be had to the following detailed description taken in conjunction with the accompanying drawing in which.

DESCRIPTION OF THE PREFERRED EMBODIMENT

Figure 1:
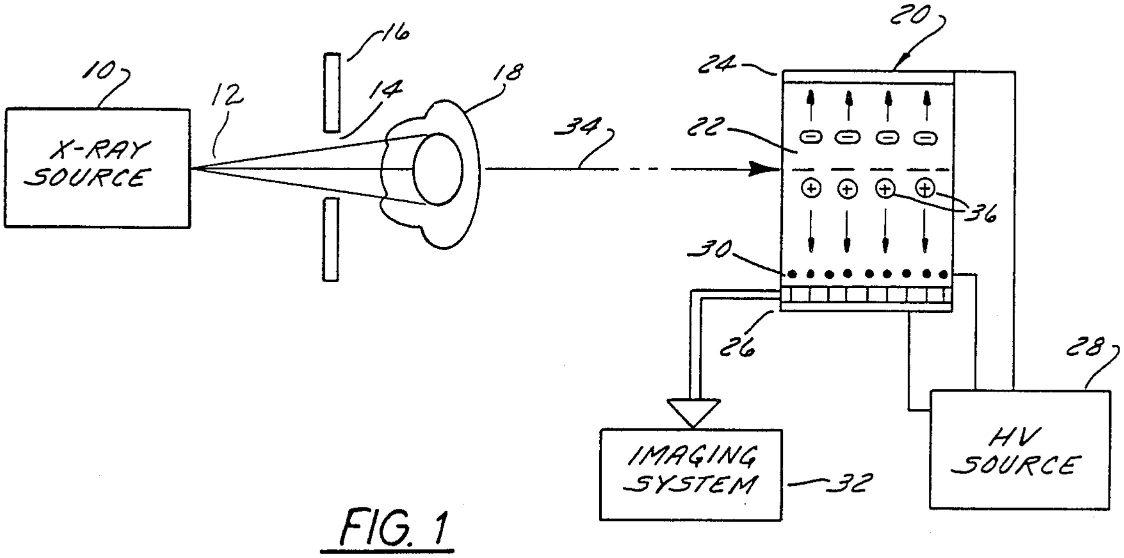
FIG. 1 is a simplified diagram of a kinestatic charge detector system.

FIG. 1 is a simplified illustration of a kinestatic charge detector (KCD) system of a type with which the present invention is particularly useful. A detailed description of a kinestatic charge detection system can be had by reference to the article entitled "Kinestatic Charge Detection" by Frank A. DiBianca and Marion D. Barker, published in the May/June, 1985 edition of *Medical Physics,* vol. 12, #3, pp. 339-343, and in pending patent application Ser. No. 721,727 filed Apr. 10, 1985 for DiBianca (U.S. Pat. No. 4,707,608). In this system, an x-ray source 10 provides a beam of x-ray radiation 12 which is collimated by passage through a slit 14 in a collimator 16. The x-ray beam is typically 8 to 10 mm wide in the plane of FIG. 1 and 350 to 500 mm wide perpendicular to the plane of FIG. 1 at the entrance to the detector. These two directions are referred to as the scan direction and transverse direction, respectively. The x-ray radiation passes through a patient 18 and the attenuated radiation then enters into an ionization chamber 20 of the kinestatic charge detection system. For purposes of discussion, the KCD system may be but is not limited to use of a gas-filled ionization chamber. The chamber 20 includes an ionization space or detection volume 22 preferably containing a heavy gas such as xenon in a region between a planar anode 24 (sometimes referred to as a high voltage plate or electrode) and a parallel planar collector electrode 26. A voltage source 28 is connected between the anode 24 and the collector electrode 26 to induce an electric field across the detection volume 22 in the region between the two electrodes. A parallel planar grid 30 is also located in the detection volume 22 adjacent the collector electrode 26. The grid 30 is also provided with an electrical potential from the high voltage source 38.

An x-ray photon which is absorbed in the gas within the detection volume 22 typically produces a photoelectron which in turn produces a number of electron/ion pairs in the gas. Electrons drift rapidly to the anode 24 while the ions drift much more slowly to the cathode or collector electrode 26. Because a relatively large voltage is present on the grid 30, the ions accelerate through the grid and reach the collector electrode 26.

The number of ions which reach the collector electrode 26 can be controlled by adjusting the voltage of source 28 so that the electric field between the grid and the collector electrode is sufficient to assure that a continuous field is present to direct the ions toward the collector electrode. An imaging system 32 receives signals from collector electrode 26 representative of the quantity and distribution of ions reaching the electrode. The imaging system 32 uses this data to construct an x-ray image of the patient 18. The imaging system 32 includes a data acquisition system, a computer, processing electronics, electronic data storage and image presentation equipment, all of a type known in the art for reproducing images from digital data.

Chamber 20 is physically moved with respect to a radiation path 34 at a velocity $V_{scan}$ having a magnitude equal to that of the velocity $V_{drift}$ at which the charge carriers 36 in chamber 20 are drifting. The direction in which chamber 20 is moved is opposite the direction in which carriers 36 are drifting (and is thus perpendicular to the direction of path 34 of the incoming x-ray beam) and has the effect of making the drifting charges stationary with respect to path 34. The charge carriers drift with respect to the chamber 20 at a constant velocity, and chamber 20 is synchronously moved in a manner exactly opposite to the manner in which the charge carriers drift. Therefore, the charge carriers remain stationary with respect to path 34 for as long as the path intersects detection volume 22. All x-ray photons traveling along path 34 contribute to charges in proximity to the path. Similar integration occurs with respect to every other path drawn through the patient 18 while the KCD chamber sweeps past that path.

The apparatus and control system for moving the chamber 20 are not considered part of the present invention. Such apparatus may comprise a mechanical structure to which the chamber 20 and associated equipment are mounted. Servo drive systems may be provided to move the chamber 20 about an arc of a circle at a predetermined velocity by means well known in the art. Both the chamber 20 and collimator 16 are rotated such that the x-ray radiation scans across the patient 18 who remains stationary.

Figure 2:
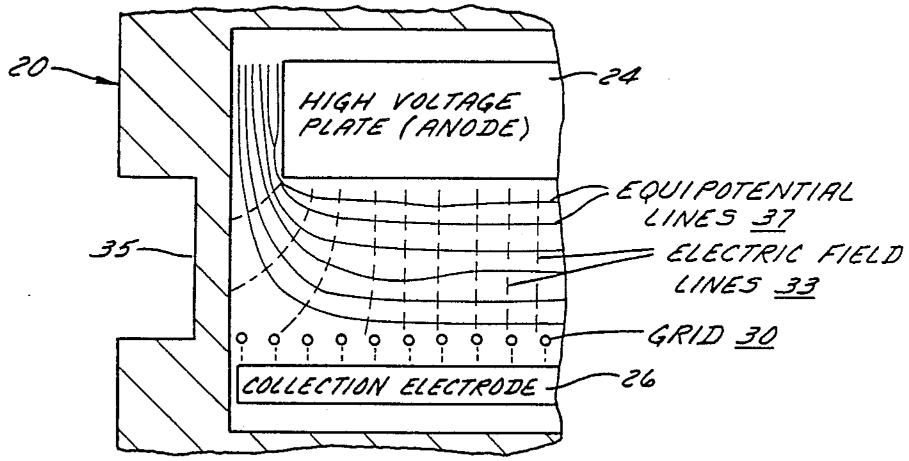
FIG. 2 is a partial cross-section of a detection volume for a kinestatic charge detector illustrating the electric field within the detector volume.

Turning now to FIG. 2, there is shown a partial cross-sectional view of the ionization chamber 20. The upper electrode, i.e., anode 24, the high voltage plate, is spaced from the side walls of the detector 20 by an insulative distance. Similarly, the collector electrode 26 is spaced from and electrically isolated from the inner surface of adjacent side walls of the chamber 20. The x-ray radiation entering the chamber passes through a transmissive window 35 and enters into the space between the anode 24 and grid 30. The electric field lines generated by the high voltage existing between the anode 24, the grid 30, the collection electrode 26 and the side walls of the chamber 20 are shown as dashed lines 33. The equal potential lines 37 indicate the potential distribution between the high voltage anode 24 and the side walls and the grid 30. As can be seen, in the area of the window 35 the electric field lines distort and bend creating what has been referred to previously as a "dead space." In the area of the distorted electric field lines, charged particles will tend to follow the path of the field lines rather than being directed to the collector electrode 26. Near the window 35, the field lines will carry the particles to the window so that none of those particles will be detected by the electrode 26. Thus, those lost particles or charge carriers affect the quantum detection efficiency of the chamber. The charge carriers which are created in the dead space but follow the curved or distorted electric field lines to the collector electrode 26 contribute to a blurring of any image created by the system. The blurring is caused by the delay due to the longer distance travelled and the lower average speed of the charge carriers following the curved paths.

Figure 3:
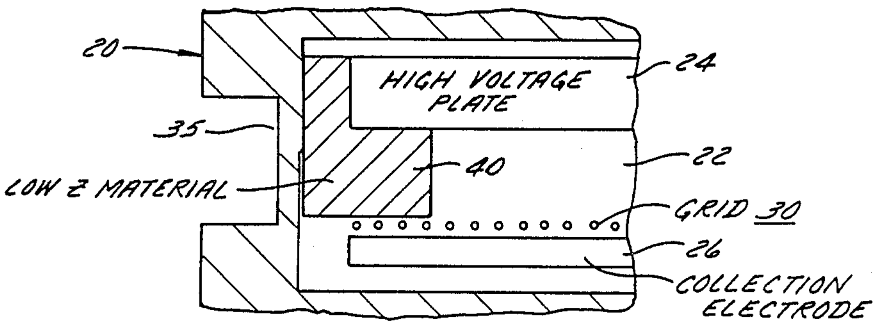
FIG. 3 is a partial cross-section view of a detection volume illustrating one form of the present invention.

FIG. 3 illustrates one form of the present invention in which a low x-ray attenuation material 38 (low-Z material) is inserted within the detection volume to displace the gaseous medium adjacent the window 35 and also in a portion of the area between the anode 24 and grid 30. The distance to which the material 38 extends into the detection volume 22 between the anode 24 and grid 30 is determined by an analysis of the electric field lines (illustrated in FIG. 2) so that the medium is displaced in those areas where the electric field lines are distorted. The low-Z material 38 may be formed as a LEXAN polycarbonate device 40 having a length the same as that of the anode 24 and electrode 26 in a direction transverse to the direction of scan. The device 40 is machined to have an L-shaped cross-section as shown in FIG. 3. The device 40 may be attached to the high voltage plate or anode 24 since this plate is typically relatively thick and rigid. The device 40 is machined to have the proper dimensions so that it fills the space between the window 35 and the anode 24 and also that portion of the space between the anode 24 and grid 30 for which the field is non-uniform.

Since the medium, i.e., the xenon gas, in the detector volume is displaced in the "dead space", no charge carriers are generated in the area filled by the device 40 and accordingly the distorted electrical field in that area does not cause charge carriers to follow a curved path between the anode 24 and collector electrode 26. Furthermore, since the x-ray radiation is allowed to pass through the dead space without interacting with the medium, more radiation is available to interact with the medium in the area of the detection volume 22 which produces charges that are collectable by the collector electrode 26. For this reason, the quantum detection efficiency of the detector is improved. It should be noted that if blurring occurs in the generated image as a result of Compton and fluorescent scatter from the detection medium adjacent the rear wall of the detector 20, a similar section of low-Z material 36 may also be placed adjacent the rear wall so as to displace the medium in that area. Such an arrangement is described infra with respect to FIG. 6.

Figure 4:
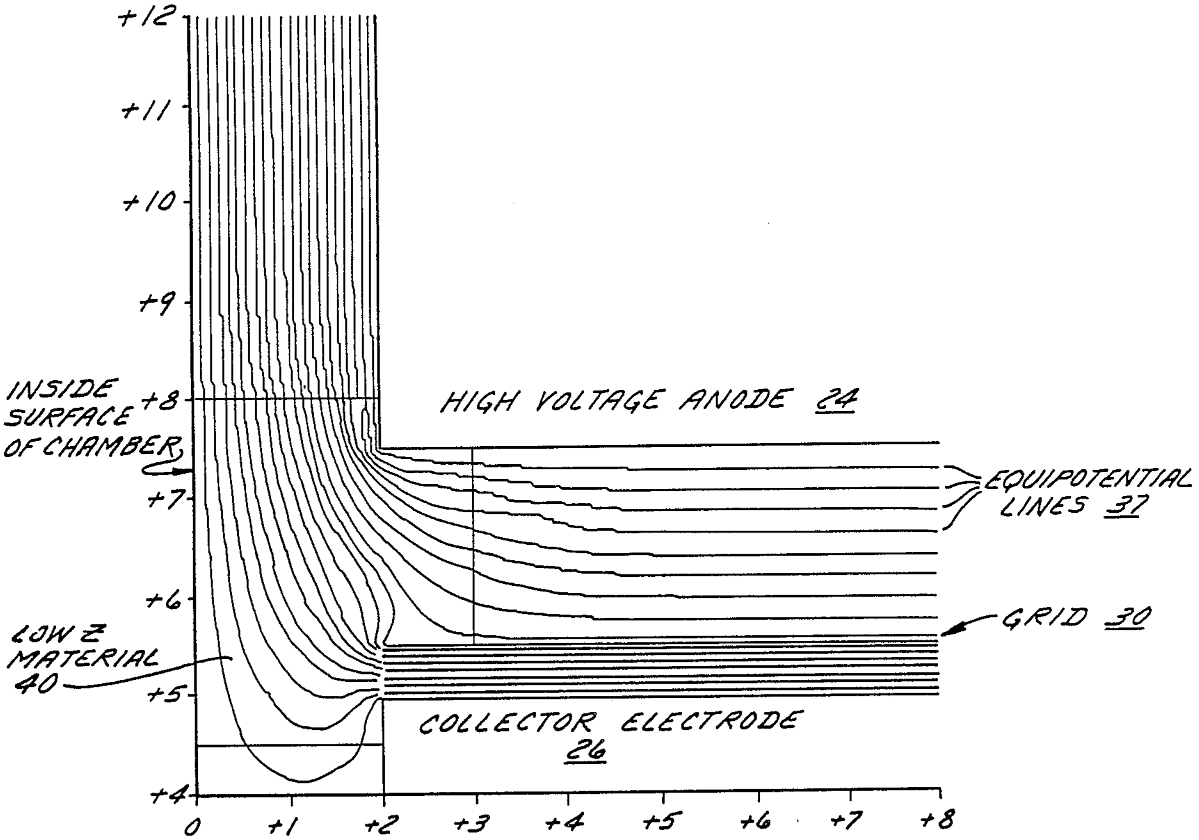
FIG. 4 illustrates a finite element calculation of the electric potential distribution inside a detection volume in which the apparatus of FIG. 3 is employed.

FIG. 4 illustrates the results of a finite element calculation of the electric potential distribution inside a detection volume 22 in which the device 40 described above has been positioned. The spacing between the window 35 and the adjacent edges of the anode 24 and collector electrode 26 is approximately 2 mm. The spacing between the anode 24 and grid 30 is also about 2 mm. The device 40, formed of a dielectric material with a dielectric constant of about 3 (such as LEXAN polycarbonate) is placed in the gap between the window 35 and anode 24 and extends 1 mm. into the space between the anode 24 and the grid 30. The gas medium in the detector volume 22 is xenon at a pressure of 35 atmospheres. A beam of 70 keV x-rays is attenuated by 6.4% by the device 40 and 3.6% of the charge carriers created in the detection medium do not reach the collector electrode 26. In comparison, for a chamber without the inventive device 40, 37% of the x-ray radiation beam produces charge carriers in the detection medium that do not reach the collector electrode 26. Accordingly, the present invention provides a significant improvement in quantum detection efficiency for the chamber 20.

Although the device 40 does not extend so far into the space between the anode 24 and the grid 30 as to reach an area wherein the equal potential lines are completely parallel, it will be noted that the improvement to be gained by further extending the device 40 is not significant. Accordingly, some judgment need be exercised in determining the distance to which the device 40 extends into the space between the anode 24 and the grid 30. It should also be noted that other embodiments of device 40 differing in shape and means of support are within the teaching of the present invention. For example, FIG. 3 illustrates an L-shaped device 40 attached to the high voltage plate or anode 24, while FIG. 4 illustrates a T-shaped device 40 attached to both the high voltage anode 24 and the grid 30.

Figure 5A:
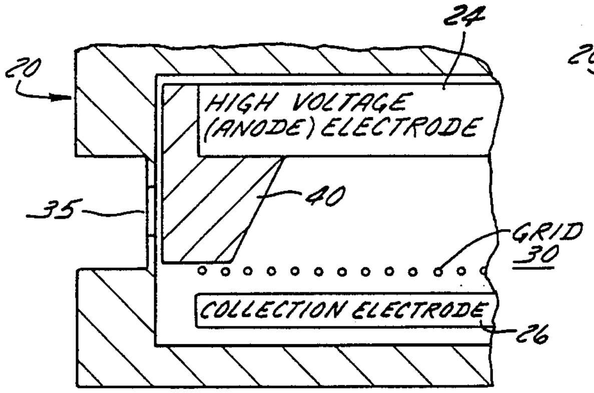
FIGS. 5A and 5B illustrate alternate embodiments of the present invention.
Figure 5B:
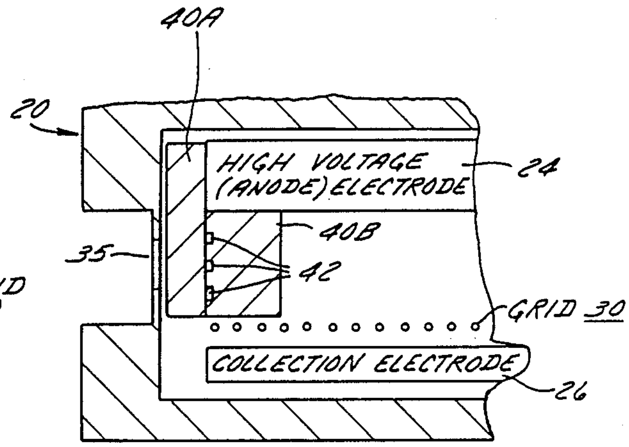

FIGS. 5A and 5B illustrate further modifications in the implementation of the present invention. In FIG. 5A the shape of the device 40 of low-Z material is changed so that the side that extends into the region or space between the anode 24 and grid 30 has a face that is not parallel to the entrance window 35. This modification changes the shape of the region in which charge carriers 36 are created. For a given distance from the window 35, charge carriers created near the high voltage anode 24 cause greater losses in quantum detection efficiency and in spatial resolution than charge carriers created near the grid 30. Therefore it is desirable to displace the detection medium to a greater depth (with respect to window 35) near the high voltage anode 24 than near the grid 30. FIG. 5A illustrates one possible shape of the device 36 that accomplishes this goal and is only one example of a shape for device 40 that has the desirable effect of excluding more of the detection medium near the high voltage anode 24 than near the grid 30. Other shapes may be devised for producing different gains in quantum detection efficiency and improving spatial resolution.

The modification shown in FIG. 5B utilizes a block or device 40 of low-Z material combined with a field shaping structure. The dimensions of the device 40 are the same as those of FIG. 2, but the two portions 40A and 40B making up the L-shape configuration are separately machined and then bonded together. At the area of joining, one of the pieces, the portion 40B in FIG. 5B, has a plurality of small grooves or slots machined in it to accommodate field shaping wires 42 which are, for example, 1 to 5 mils in diameter. The wires 42 run the length of the detection volume, i.e., in the direction transverse to the direction of scanning. One end of each of the wires 42 is connected to a corresponding reference voltage for establishing a shaped field to counter the distorted field along the window area of the chamber 20. The reference voltage for each of the wires 42 may be derived from a resistive voltage divider network (not shown) of a type well known in the art. The potential on each of the wires 42 is preferably different so as to establish a field gradient between anode 24 and grid 30. The device 40 is rigidly attached to the high voltage anode 24 in the same manner as the device 40 of FIG. 3. The field shaping modifies the electric potential field between the anode 24 and grid 30 to compensate for some of the distortion shown in FIG. 2. The advantage of the arrangement in FIG. 5B over that proposed by the prior art, is that fewer field shaping wires 42 need be used to attain the same correction obtained without the dielectric device 40. This arrangement simplifies the construction of the chamber 20 and also allows the device 40 and field shaping wires 42 to be built as a self-contained unit separate from the detector pressure vessel or chamber 20. Furthermore, alignment is easier because the device 40 is attached to the detector anode 24, the grid 30, or the support for collector electrodes 26 and can be included in an insert to the pressure chamber 20 so that there is less dependence on the alignment of the device 40 with the pressure vessel or chamber 20 itself.

Figure 6:
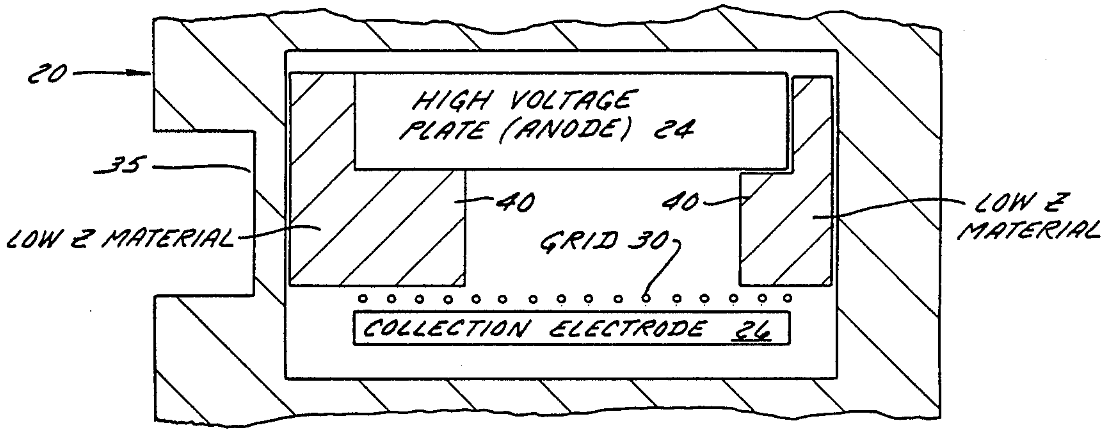
FIG. 6 is a cross-sectional view of a KCD chamber or detection volume illustrating one method of displacing the ionizing medium adjacent both a front and a rear wall of the chamber.

FIG. 6 illustrates the use of dielectric device 40 in both a front or window area of a detection chamber 20 and a rear area. The "dead space" adjacent the rear surface of the chamber will increase the contribution to the signal from Compton and fluorescent scatter. Eliminating this x-ray scatter reduces unwanted background noise.

In the above discussion and calculation, the material with low x-ray attenuation has been described as a "low-Z material", with LEXAN polycarbonate being used as a specific example. In general, the device 40 may be formed of any material which displaces the detector medium in the "dead space" region and has a low x-ray absorption. In particular, other plastics could be utilized as well as materials selected from the class of foamed materials such as, e.g., foamed glass and polyurethane foam. In these foamed materials, small bubbles have been introduced which occupy a substantial fraction of the volume defined by a block of the material. Such materials can have very low x-ray absorption and would provide better performance than that demonstrated in the above calculation using lexan polycarbonate. The only restriction on the material is that it not deform under the pressure of the gas in the detector and that the material be impervious to penetration by the gas at the operating pressure of the detector.

The present invention improves the spatial resolution in the KCD system by causing the field in which the ions drift within the detector volume to be more uniform. As compared to prior art field shaping techniques, the present invention reduces QDE losses due to absorption of radiation in the region between the window and the electrodes. In the present invention the detection medium in this region is displaced by a material with low x-ray attenuation. Prior art techniques used field shaping to reduce distortions in the electric field in this region. With such prior art techniques there always exists a region in the detection medium in which carriers are created but are not collected. This is so because perfect field shaping cannot be obtained at an arbitrarily small distance from the field shaping structure. Physical requirements such as the need for a mechanical support for the grid, the necessity of space between the detection window and the anode and collector electrodes for assembly of the detector, and space needed to prevent arcing between the various detector parts further increase the volume of the detection medium in which charge carriers that do not reach the collector electrode are created.

The present invention also improves the operation of the KCD system by eliminating the medium in the area of the dead space at the front of the detection chamber so that Compton and fluorescent scatter from this region are reduced. X-ray radiation that scatters from the dead space region and produces ions within the detector is known to produce background noise. By eliminating the dead space, the background noise is reduced.

The present invention also reduces the possibility of arcing between conductive wires or strips in the chamber 20 since any wires which may be used are encased in a non-conductive material.

While the invention has been described in detail in accordance with what is considered to be a preferred embodiment, many modifications and changes may be effected by those skilled in the art. Accordingly, it is intended by the appended claims to cover all such modifications and changes which fall within the true spirit and scope of the invention.

We claim:

1. In a kinestatic charge detector having first and second electrodes and a medium disposed in a detection volume for generating charge carriers in response to incident radiation, said detection volume being defined by inner surfaces of a closed chamber, non-random motion of said charge carriers being affected by an electric field between said electrodes, apparatus for improving quantum detection efficiency and spatial resolution comprising a radiation transmissive device positioned in said detector volume adjacent an inner surface of said chamber and transverse to the direction of said incident radiation, said device displacing said medium in at least a portion of said detection volume in which said field is distorted and preventing creation of charge carriers in said distorted field portion.

2. The detector of claim 1 wherein said device extends into a space between said electrodes.

3. The detector of claim 2 wherein said device is attached to one of said electrodes.

4. The detector of claim 2 wherein said chamber includes an incident radiation admitting window, said device being positioned adjacent said window.

5. The detector of claim 4 and including a second radiation transmissive device positioned adjacent another inner surface of said chamber opposite said window, said second device displacing said medium between said another inner surface and an edge of said electrodes.

6. The detector of claim 4 wherein said device has an L-shaped configuration, one arm of said device extending parallel to and adjacent said window and between said window and said first electrode, another arm of said device extending into said space between said electrodes.

7. The detector of claim 6 wherein said device has a plurality of holes formed therethrough and a corresponding plurality of electrical conductors in said holes, said conductors being energized by an electrical potential for modifying said electric field between said electrodes.

8. The detector of claim 2 wherein said first electrode is a planar electrode at a relatively high voltage with respect to said second electrode, said device extending further into said space adjacent said first electrode than said second electrode.

9. The detector of claim 8 wherein a distal end of said device extending into said space between said electrodes is formed at an angle with respect to an imaginary perpendicular line extending between said electrodes.

10. The detector of claim 1 wherein said device is formed of a polycarbonate resin.

11. Apparatus for detecting x-ray radiation comprising:

means defining a space for receiving incident radiation, said means including a window for admitting incident radiation into said space and first and second electrodes positioned on opposite sides of said space such that radiation entering said window passes between said electrodes;

medium means disposed in said space for interacting with said incident radiation for producing charge carriers;

means for creating an electric field between said electrodes for causing said charge carriers to drift toward said electrodes at a controlled rate, said field being distorted in areas adjacent edges of said electrodes;

means for detecting charge carriers impinging on said electrodes; and x-ray radiation transmissive means positioned in said space adjacent said window for displacing a portion of said medium means, said transmissive means extending into said electric field a distance sufficient to displace said medium means in a substantial portion of said distorted field area and prevent creation of charge carriers in said distorted field area.

12. The apparatus of claim 11 wherein said x-ray transmissive means comprises an L-shaped block having first and second perpendicularly oriented arms, one of said arms extending parallel to and in proximity to an inner surface of said window, the other of said arms extending into said space between said electrodes.

13. The apparatus of claim 12 wherein said first electrode is at a relatively high voltage with respect to said second electrode, said block being attached to said first electrode.

14. The apparatus of claim 12 wherein a surface of said other of said arms in said space is angularly formed with respect to said window.

15. The apparatus of claim 12 wherein a plurality of apertures are formed in said block at the intersection of said first and second arms and including a corresponding plurality of electrical conductors positioned in said apertures, said conductors being electrically energized for creating an electric field interacting with said field between said electrodes for minimizing non-uniformities.

16. An apparatus for detecting x-ray radiation comprising:

means for defining a space for receiving incident radiation, said means including a window for admitting radiation into said space;

a medium disposed in said space, said medium interacting with said x-ray radiation for generating charge carriers;

a first electric field generating anode positioned in said space in a plane adjacent a first inside surface of said space defining means;

a collector electrode positioned in said space in a plane adjacent a second inside surface of said space defining means, said first surface being opposite said second surface and defining a charge carrier generation space therebetween, said collector electrode being electrically biased with respect to said field generating anode for creating an electric field between said anode and said electrode, said electric field effecting non-random motion of said charge carriers and said electrode detecting the charge carriers generated in said space;

an electrically charged grid positioned in a plane parallel to and adjacent said electrode for accelerating said charge carriers toward said electrode; and x-ray transmissive means positioned in said space adjacent said window for displacing said medium, said transmissive means extending into said charge carrier generation space over a predetermined area between said anode and said grid for preventing generation of charge carriers in said predetermined area.

17. A method for improving quantum detection efficiency and spatial resolution in an x-ray radiation detecting chamber of the type enclosing an ion producing medium responsive to impinging radiation energy for generating charge carriers, the charge carriers being non-randomly moved by an electric field established in the chamber between spaced electrodes, the electric field being distorted in areas adjacent walls of the chamber and extending into a space between the electrodes, said method comprising the step of displacing the medium in the distorted area to prevent generation of charge carriers therein.

18. The method of claim 17 wherein said step of displacing comprises the step of positioning an x-ray transmissive means in the distorted field area.

19. The method of claim 18 wherein said positioning step includes positioning the x-ray transmission means between a portion of the electrodes adjacent the walls of the chamber.

* * * * *